Dec. 3, 1935.   W. E. BETTENDORF   2,022,877
BREAD SLICING MACHINE
Filed March 31, 1932   4 Sheets-Sheet 1
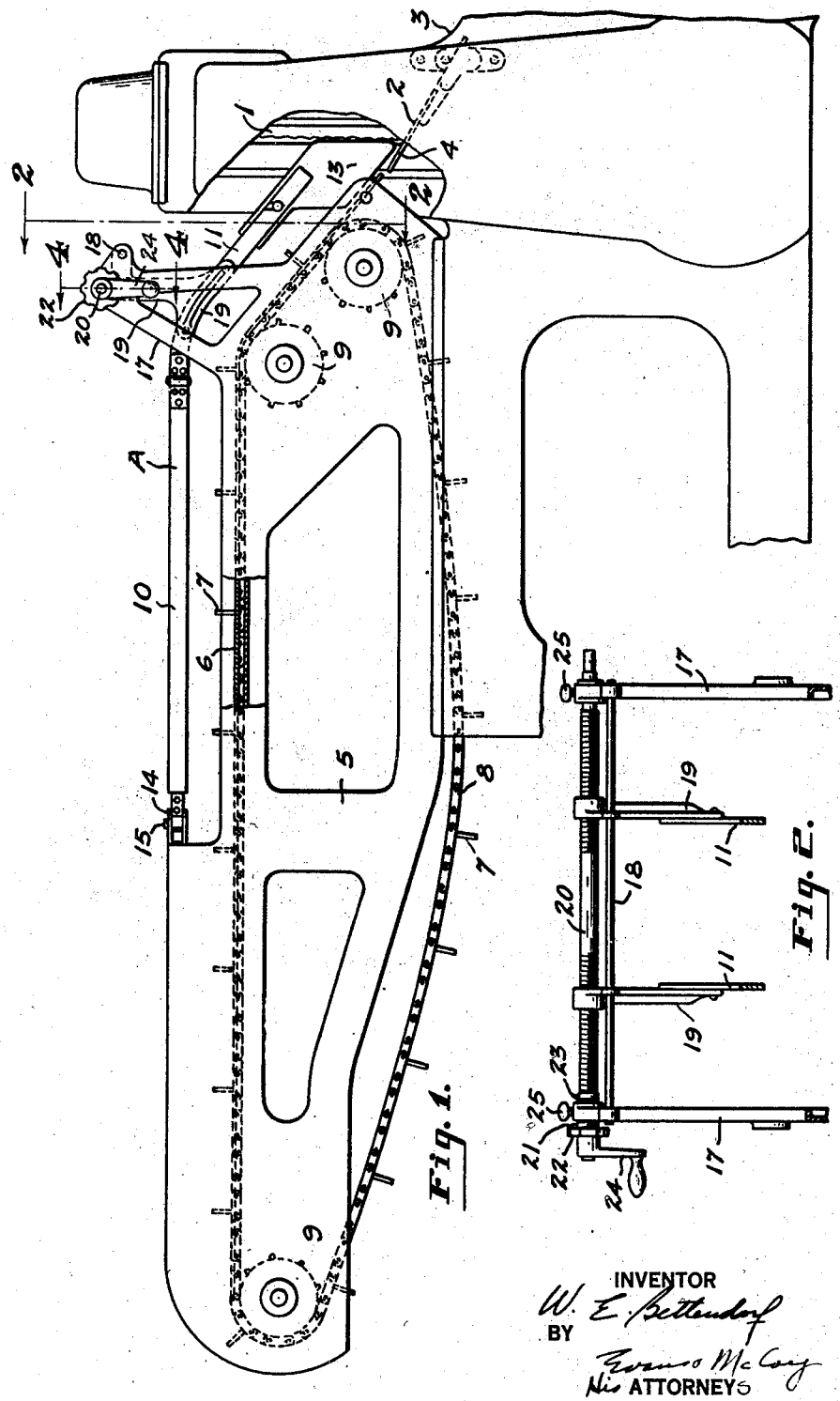
INVENTOR
W. E. Bettendorf
BY
Evans & McCoy
His ATTORNEYS Dec. 3, 1935.  W. E. BETTENDORF  2,022,877
BREAD SLICING MACHINE
Filed March 31, 1932  4 Sheets-Sheet 2
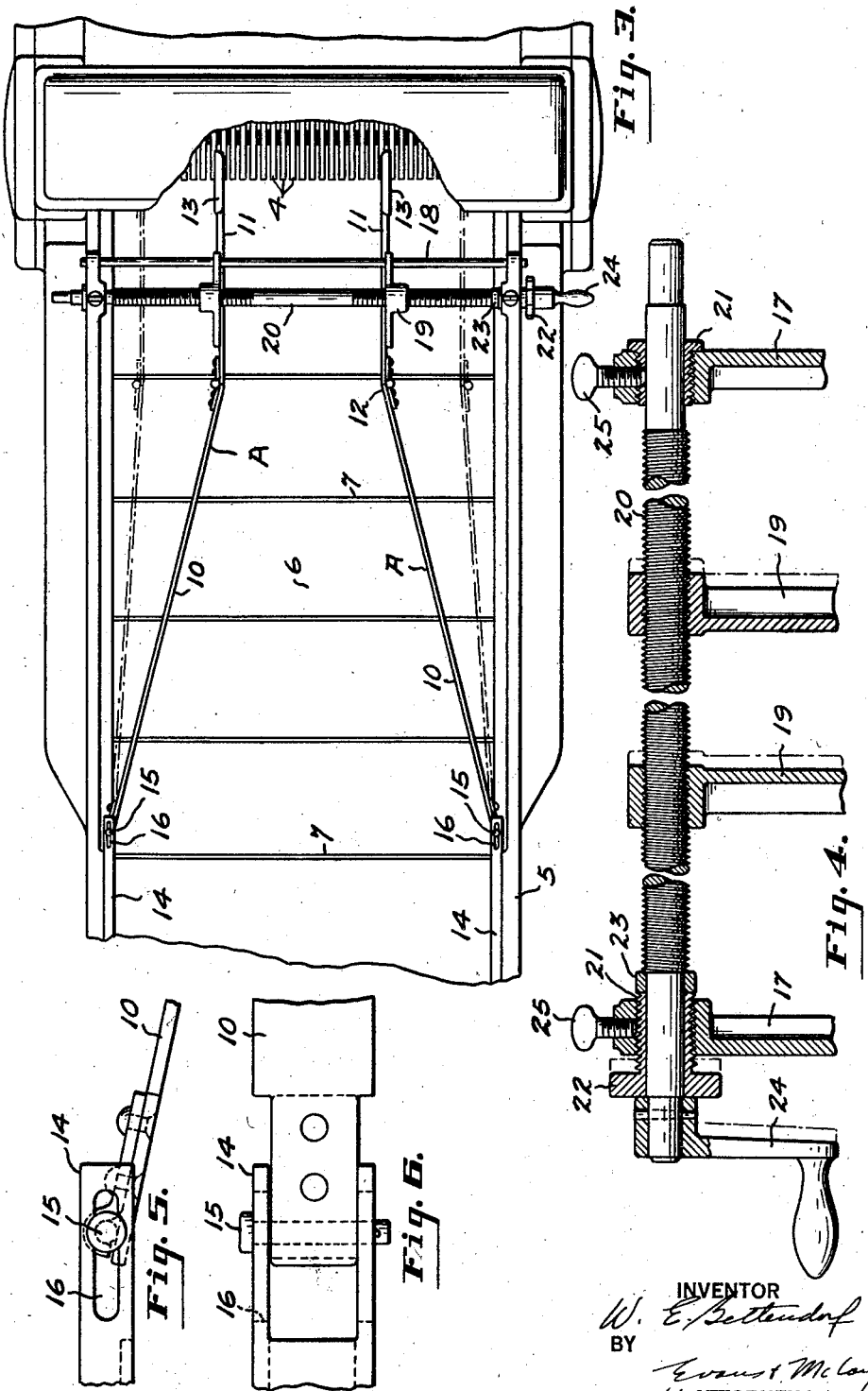

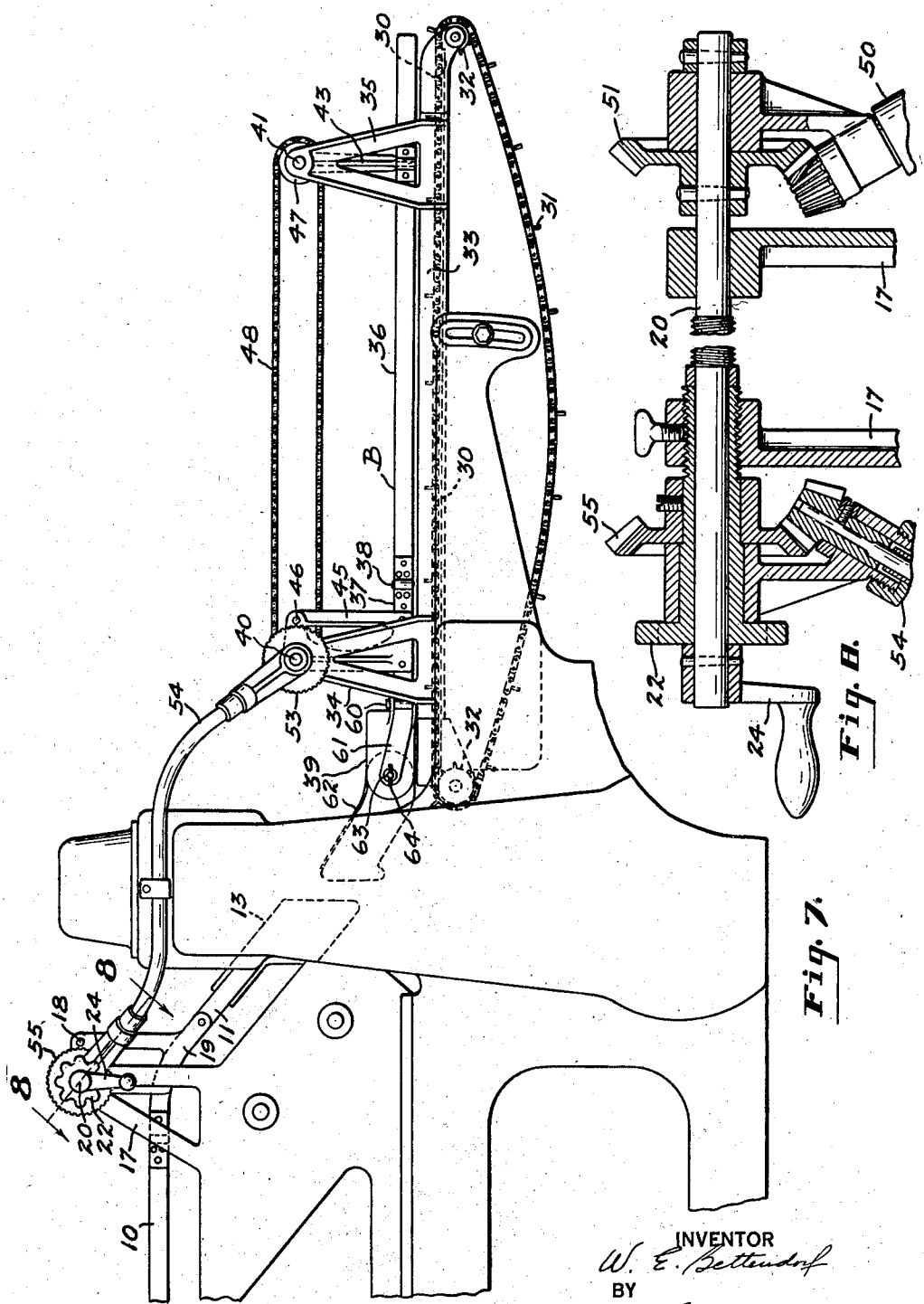

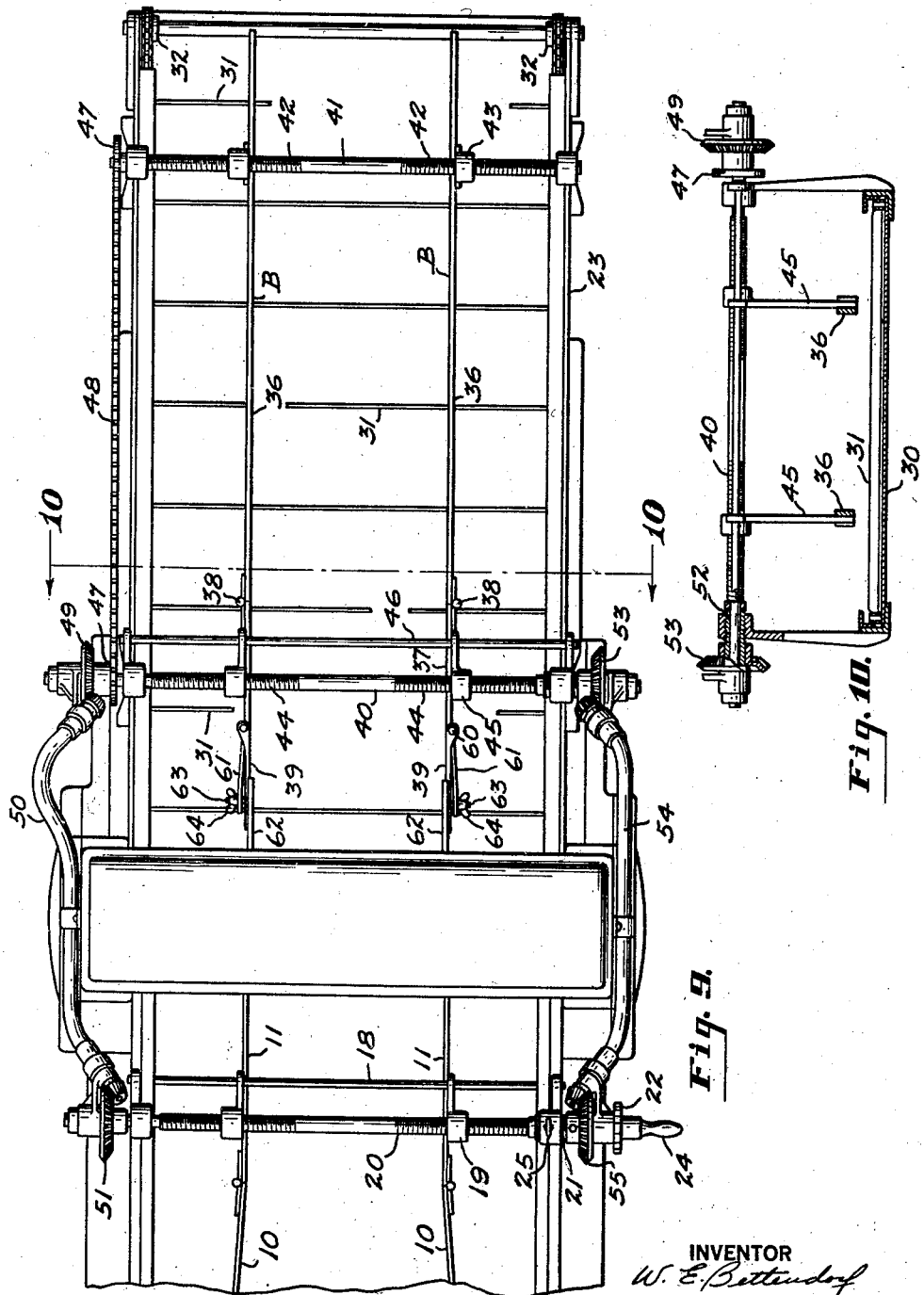

Patented Dec. 3, 1935

2,022,877

UNITED STATES PATENT OFFICE 2,022,877

BREAD SLICING MACHINE

William E. Bettendorf, Davenport, Iowa, assignor, by mesne assignments, to The Micro Corporation, Bettendorf, Iowa, a corporation of Delaware Application March 31, 1932, Serial No. 602,245

19 Claims. (Cl. 146—153)

This invention relates to bread slicing machines, and particularly to the means for feeding the loaves of unsliced bread to the slicing mechanism.

In the commercial slicing of bread it frequently happens that two or more batches of bread having different lengths are sliced on the same slicing machine, and it is therefore necessary to provide some suitable means for guiding the bread up to the cutters that will properly position the loaves adjacent the cutters so that, during slicing, the heels of the loaves will be of substantially the same thickness. It is therefore one of the objects of the present invention to provide a bread slicing machine with new and improved means for guiding the loaves of bread as they are fed to the slicing mechanism.

Another object is to provide a bread slicing machine having a feed conveying mechanism with a pair of side guides over the conveying mechanism in which the side guides can be simultaneously moved toward and away from each other and which can be bodily moved as a unit transversely of the slicing mechanism.

With the above and other objects in view which will be apparent from the following detailed description, the present invention consists in certain features of construction and combinations of parts which will be readily understood by those skilled in the art to which the invention appertains.

Referring to the drawings which illustrate suitable embodiments of the invention, Figure 1 is a fragmentary side elevation of one type of slicing machine to which the apparatus of the present invention may be applied, portions of the same being broken away to show the feed conveyor and the slicing mechanism;

Fig. 2 is an enlarged section taken substantially on the line 2—2 of Fig. 1 showing the adjusting means for the side guides in front elevation;

Fig. 3 is a plan view of the apparatus shown in Fig. 1;

Fig. 4 is an enlarged section taken substantially on the line 4—4 of Fig. 1;

Fig. 5 is an enlarged fragmentary plan view showing the slicing pivotal connection of the bread guiding means;

Fig. 6 is an enlarged side elvation of the guiding means shown in Fig. 5;

Fig. 7 is an enlarged side elevation of a bread slicing machine in which the guiding means over the feeding and discharge conveyors are connected for simultaneous adjustment;

Fig. 8 is an enlarged section taken on the line 8—8 of Fig. 7;

Fig. 9 is a plan view of the apparatus shown in Fig. 7; and

Fig. 10 is a section taken on the line 10—10 of Fig. 9.

Referring to the accompanying drawings in which like numerals refer to like parts throughout the several views, the slicing machine illustrated in the drawings as being one type to which the apparatus of the present invention may be applied, is of the reciprocable blade type in which a plurality of cutters 1 are arranged to reciprocate in a vertical direction. The bread or other baked article being sliced is supported during the slicing operation by means of a transfer plate 2 secured to the side frames 3 of the slicer and having a plurality of finger portions 4 which extend rearwardly between the cutters 1. In the apparatus shown in Fig. 1 the side frames of the slicing machine are provided with rearward extensions 5 which support an endless feed conveyor. This conveyor comprises a feed table 6 extending horizontally between the rearward extensions 5, and which at its forward end inclines downwardly toward the cutters 1 and terminates immediately above the fingers 4 of the bread transfer plate 2, as shown in Fig. 1. The bread to be sliced is disposed on the feed table 6 and moved forwardly toward the cutters by means of transversely extending flights 7 which are secured at their ends to a pair of side chains 8 which are arranged to operate over suitable sprocket wheels 9, certain of which are driven.

The bread is guided and properly centered on the feed table 6 by means of a pair of spaced side guides A disposed above the feed table 6 and conveyor flights 7. Each guide A is composed of a horizontal rearward part 10 and a forward part 11 which is inclined downwardly to substantially the same angle as the inclined portion of the feed table 6 and hinged by means of a pin 12 to the forward end of the rearward part 10. The forward ends of the forward part 11 of each side guide is provided with a guide plate 13 secured thereto which terminates immediately adjacent the cutter blades 1 and which is of sufficient depth to have its lower edge positioned adjacent the inclined portion of the feed table 6, in order that the guide plate together with the opposed guide plate will have substantial engagement with the loaf of bread to properly guide the bread through the cutter blades 1.

The rear end of the rearward part 10 of each side guide A is received between the legs of a forked member 14 secured to the side frame extension 5 and is arranged to have pivotal movement as well as longitudinal movement relative to the member 14 by means of a hinge pin 15 that extends through longitudinal slots 16 formed in the legs of the forked member 14. The pins 15, therefore, permit pivotal and longitudinal movement of the side guides A but hold the rear ends of the parts 10 against transverse movement.

The forward parts 11 of the side guides A are suspended from adjustable supporting mechanism in a manner to be presently described. It is thus seen that the rearward parts 10 of the side guides are spaced relatively far apart at their rear ends and converge toward the forward parts 11 which are arranged parallel to each other and disposed a distance apart sufficient only to permit a loaf of bread to be moved therebetween preferably with a slight friction. The loaves of bread to be sliced are disposed on the rear portion of the conveying mechanism and as each loaf is moved forwardly by a flight 7, one or the other of the convergent guide parts 10 causes the loaf to gradually move to a centered position on the feed table 6. Although the loaves of bread out of one batch to be sliced may have a slight variance in length, they will be centered and moved between the forward guide parts 11. Here they will be held and properly centered by the guide plates 13 so that they will be correctly sliced with the heel portions thereof of substantially the same thickness, whereby the maximum number of slices may be obtained from each loaf.

The forward parts 11 of the side guides A are supported for movement toward and away from each other and also for simultaneous bodily movement by means of a novel adjusting mechanism. Each of the extensions 5 is formed with an upwardly extending bracket portion 17 and a guide rod 18 is disposed transversely between the bracket portions 17, as shown in Figs. 1 and 3. The side guide parts 11 are also provided with upwardly extending bracket portions 19 which are arranged to slide transversely on the guide rod 18. Movement of the brackets 19 is provided by means of an adjusting rod 20 having its ends threaded in opposite directions and threaded into the brackets 14 which support the forward ends of the side guide parts 11. It is obvious that as the adjusting rod 20 is rotated in one direction or the other, the side guide parts 11 will be moved toward or away from each other so that these guide parts can be adjusted to any desired width for accommodating the length of loaf of bread that is to be sliced. During this relative transverse movement of the guide parts 11, it will be noted that the rear guide parts 10 are permitted to move longitudinally of the side frames by reason of the slots 16, and to pivot about their rear and forward ends by reason of the pivot pins 15 and 12, respectively.

The adjusting rod 20 is mounted at its ends within suitable journals 21 carried by the upwardly extending brackets 19, one of these journals being threaded into the upwardly extending bracket 17 and having a knurled portion 22 thereon which can be grasped to turn the journal and thread the same into or out of the bracket 17. The adjusting rod 20 is rigidly held against axial movement relative to the last mentioned journal by means of a collar 23 carried by the rod 20 and abutting against the inner end of the journal 21, and a handle member 24 rigidly secured to the outer end of the rod 20 and abutting against the outer end of the journal 21.

As previously explained, the side guide parts 11 may be moved toward and away from each other to accommodate different lengths of bread by merely turning the adjusting rod 20, the ends of which are oppositely threaded into the supporting brackets 19 of the side guide parts. Although the side guides may be adjusted to the proper width, they may be in such a position that the heels of the loaf of bread being sliced will not be of the same approximate thickness, and it may be desired to bodily shift the side guide parts 11 which are correctly spaced apart so that the loaves of bread can be fed to the cutters in the desired centered position. This can be accomplished by merely loosening a set screw 25 which is threaded into the bracket 17 to hold the knurled journal 21 against rotation, and then by rotating the journal 21 by grasping the knurled portion 22 in the proper direction which, as shown in Fig. 4, will bodily move the brackets 19 and attached side guide parts 11 as a unit to the right, as shown in broken outline.

The longitudinally movable pivot connections between the guide parts 10 and the rigid members 14, permit such bodily movement of the guide parts 11, by reason of the unrestrained longitudinal and pivotal movement of the rear guide parts 10. It is thus seen in the case of the feed conveying mechanism that two adjustments of the side guides are provided, one to permit bodily transverse movement of the side guides relative to the conveyor to properly center the loaves of bread with respect to the slicing cutters, and another to permit relative movement of the side guides in order that they will properly guide the loaves of bread.

In some cases where a discharge conveyor is used, it may be desirable to so connect the side guides of the discharge machinsm with the side guides of the feeding mechanism that they may be simultaneously adjusted. Such a mechanism is illustrated in Figs. 7 to 10, inclusive, wherein the discharge conveyor is shown as comprising a discharge table 30 over which a plurality of flights 31 are arranged to move. The flights 31 extend between suitable spaced link chains that operate over sprockets 32 at the ends of the table 30.

The rearward end of the support 33 for the discharge mechanism is provided with a pair of upstanding brackets 34 and the forward end thereof is also provided with unstanding brackets 35.

Each of the discharge side guides B comprises a relatively long forward part 36 and a relatively short rearward part 37 adjacent the cutter blades and pivoted by a pin 38 to the forward part 36, the rearward part 37 being provided with a relatively wide guide plate 39, as shown in Fig. 7, which is pivoted thereto by means of a pin 60 and held in position by a flat spring 61. This guide plate 39 extends to the framework, and is provided with a secondary guide plate 62 which is adjustably hinged thereto by means of pins 63 and adjusting nuts 64, so that these plates 62 may extend at an angle substantially to the cutter blades in alignment with the guide plates 13.

The side guides B are suspended at their opposite ends from rotatable shafts 40 and 41 which respectively extend between the brackets 34 and 35. The forward shaft 41 is provided with opposite threads 42 which threadably receive depending supports 43 that are connected with the forward ends of the forward guide parts 36 so that when the shaft 41 is rotated the parts 36 may be moved relative to each other. The rearward shaft 40 is likewise provided with opposite threads 44 which threadably receive depending supports 45 that are secured to the shorter rearward guide parts 37. These supports 45 are also arranged to slide on a rigid transverse rod 46 extending between the brackets 34. Thus, as the shaft 40 is rotated, the guide parts may be moved relative to each other. However, as it is essential that the side guides B must maintain the slices of the sliced loaves of bread in presliced relation, it is obvious that the distance therebetween should be relatively uniform. In the present illustration, means is provided so that the shafts 40 and 41 may be simultaneously rotated and this is accomplished by providing each shaft with a sprocket 47. These sprockets 47 are simultaneously driven by an endless link chain 48.

Furthermore, in order to properly space the discharge side guides substantially the same distance apart as the parts 11 of the side guides A, it is preferable to rotate the shaft 40 at the same time as the adjusting rod 20 at the feed side. This is accomplished by rigidly arranging a bevel gear 49 which is driven through such means as a cable drive 50 from a gear 51 secured to the adjusting rod 20 so that as a result of the rotation of the rod 20, the shafts 40 and 41 will be simultaneously rotated to cause simultaneous movement of the side guides A and B.

Since the forward parts 11 of the side guides are bodily movable to center the same with respect to the cutter blades, it follows that the rearward parts 37 of the side guides B must also be moved the same amount. In order to save time in making these adjustments, means is provided for simultaneous bodily movement. The shaft 40 is supported in the brackets in a manner similar to the adjusting rod 20 through the medium of a journal 52 threaded into one of the brackets 34, as shown in Fig. 10. This journal is provided with a bevel gear 53 which is driven through a cable drive 54 from a gear 55 rigidly secured to the rotatable journal 21 which supports the adjusting rod 20. It is thus obvious that as the journal 21 is rotated the rod 20 and shaft 40 will be bodily moved transversely at the same time relative to the cutter blades with the result that both the guide parts 11 and 37 will be properly centered with a single adjustment. In order to permit the bodily movement of the shaft 40 and rearward guide parts 37, the guide parts 36 may be pivoted to the depending supports 43.

Although the slicing machine is illustrated as being of the reciprocating type and the conveyor as being of a continuous or endless type, it is to be understood that the invention is equally as adaptable to any other type of slicing machine such as a rotary type and to any suitable type of feeding and discharge apparatus.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. In a bread slicing machine, the combination with a plurality of regularly spaced cutters and conveying means for moving loaves of bread relative to said cutters, of means for properly guiding the loaves of bread during their movement by said conveying means, said means comprising a pair of spaced side guides mounted above said conveying means with certain of their ends adjacent said cutters and their other ends anchored for substantial longitudinal movement, and means for simultaneously moving the first mentioned ends of said side guides toward and away from each other.

2. In a bread slicing machine, the combination with a plurality of regularly spaced cutters and conveying means for moving loaves of bread relative to said cutters, of means for properly guiding the loaves of bread during their movement by said conveying means, said means comprising a pair of spaced side guides mounted above said conveying means with certain of their ends adjacent said cutters and their rearward ends anchored for substantial longitudinal movement, and means for bodily moving the first mentioned ends of said side guides as a unit transversely of said feeding means.

3. In a bread slicing machine, the combination with a plurality of regularly spaced cutters and conveying means for moving loaves of bread relative to said cutters, of means for properly guiding the loaves of bread during their movement by said conveying means, said means comprising a pair of spaced side guides mounted above said conveying means with their forward ends adjacent said cutters and their rearward ends mounted for substantial movement, means for simultaneously moving the forward ends of said side guides toward and away from each other, and means for moving the forward ends of said side guides as a unit transversely of said conveying means.

4. In a bread slicing machine, the combination with a plurality of regularly spaced cutters and conveying means for moving loaves of bread relative to said cutters, of means for properly guiding the loaves of bread during their movement by said conveying means, said means comprising a pair of spaced side guides mounted above said conveying means with their forward ends adjacent said cutters and their rearward ends held against substantial transverse movement and mounted for substantial longitudinal movement, a pair of spaced side frame portions, a transversely extending rod journaled in said side frame portions and having spaced portions oppositely threaded and in threaded engagement with said side guides, whereby upon rotation of said rod said guides may be moved toward and away from each other.

5. In a bread slicing machine, the combination with a plurality of regularly spaced cutters and conveying means for moving loaves of bread relative to said cutters, of means for properly guiding the loaves of bread during their movement by said conveying means, said means comprising a pair of spaced side guides mounted above said conveying means with their forward ends adjacent said cutters and their rearward ends held against substantial transverse movement, a pair of spaced side frame portions, an adjusting rod having oppositely threaded portions in threaded engagement with said side guides, and means for mounting said rod in said frame portions, said means comprising journals surrounding the ends of said rod and threaded into said frame portions, said rod being held against axial movement relative to said journals whereby upon rotation of one of said journals said rod and said attached side guides may be moved bodily as a unit transversely of said conveying means.

6. In a bread slicing machine, the combination with a plurality of regularly spaced cutters and conveying means for moving loaves of bread relative to said cutters, of means for properly guiding the loaves of bread during their movement by said conveying means, said means comprising a pair of side guides mounted above said conveying means with their forward ends adjacent said cutters and their rearward ends held against substantial transverse movement, a pair of spaced side frame portions, a slide rod extending transversely between said side frame portions, and a rotatable adjusting rod also extending between said side frame portions, said adjusting rod having its ends oppositely threaded and in threaded engagement with said side guides and said side guides having sliding engagement with said slide rod.

7. In a bread slicing machine, the combination with a plurality of regularly spaced cutters and conveying means for moving loaves of bread relative to said cutters, of means for properly guiding the loaves of bread during their movement by said conveying means, said means comprising a pair of side guides mounted above said conveying means with their forward ends adjacent said cutters and their rearward ends held against substantial transverse movement, a pair of spaced side frame portions, a slide rod extending transversely between said side frame portions, a rotatable adjusting rod also extending between said side frame portions, said adjusting rod having its ends oppositely threaded and in threaded engagement with said side guides and said side guides having sliding engagement with said slide rod, and a journal member for said adjusting rod threaded into one of said side frame portions and being held against movement axially of said adjusting rod whereby upon threading movement of said journal members said adjusting rod and side guides may be moved as a unit transversely of said conveying means.

8. In a bread slicing machine, the combination with a plurality of regularly spaced cutters and conveying means for moving loaves of bread relative to said cutters, of means for properly guiding the loaves of bread during their movement by said conveying means, said means comprising a pair of spaced side guides mounted above said conveying means, each comprising a longitudinal part adjacent said cutters, and a part hinged thereto and mounted over said conveying means remote from said cutters, supports for the longitudinal parts of said side guides, a transversely extending shaft having oppositely threaded portions threadedly receiving said supports, and means for rotating said shaft.

9. In a bread slicing machine, the combination with a plurality of regularly spaced cutters and conveying means for moving loaves of bread relative to said cutters, of means for properly guiding the loaves of bread during their movement by said conveying means, said means comprising a pair of spaced side guides mounted above said conveying means, each comprising a longitudinal part adjacent said cutters, and a part hinged thereto and mounted over said conveying means remote from said cutters, supports for the longitudinal parts of said side guides, a transversely extending shaft having oppositely threaded portions threadably receiving said supports, means for continuously holding said longitudinal parts in parallel relation, and means for rotating said shaft.

10. In a bread slicing machine, the combination with a plurality of regularly spaced cutters and conveying means for moving loaves of bread relative to said cutters, of means for properly guiding the loaves of bread during their movement by said conveying means, said means comprising a pair of spaced side guides mounted above said conveying means, each comprising a longitudinal part adjacent said cutters, and a part hinged thereto and mounted over said conveying means remote from said cutters, supports for the longitudinal parts of said side guides, a transversely extending shaft having oppositely threaded portions threadably receiving said supports, and a rotatable journal for said shaft for bodily moving said shaft transversely of said conveying means.

11. In a bread slicing machine, the combination with a plurality of regularly spaced cutters and feeding means for moving loaves of bread up to said cutters, of a pair of spaced side guides mounted above said feeding means, each comprising a forward part and a rearward part hingedly connected together, means for supporting the rear ends of said rearward parts, a transverse shaft supporting said forward parts and having oppositely threaded portions threadably receiving said forward parts, and means for rotating said shaft to move said forward parts relative to each other.

12. In a bread slicing machine, the combination with a plurality of regularly spaced cutters and feeding means for moving loaves of bread up to said cutters, of a pair of spaced side guides mounted above said feeding means, each comprising a forward part and a rearward part, hingedly connected together, means for supporting the rear ends of said rearward parts, a transverse shaft supporting said forward parts and having oppositely threaded portions threadably receiving said forward parts, means for rotating said shaft to move said forward parts relative to each other, and means for holding said forward parts in parallel relation during their relative movement.

13. In a bread slicing machine, the combination with a plurality of regularly spaced cutters and feeding means for moving loaves of bread up to said cutters, of a pair of spaced side guides mounted above said feeding means, each comprising a forward part and a rearward part hingedly connected together, means for supporting the rear ends of said rearward parts, a transverse shaft supporting said forward parts and having oppositely threaded portions threadbly receiving said parts, journals for supporting said shaft, and supports threadably receiving said journals, said journals being threadable in said supports to bodily move said shaft relative to said feeding means in a transverse direction.

14. In a bread slicing machine, the combination with a plurality of regularly spaced cutters and feeding means for moving loaves of bread up to said cutters, of a pair of spaced side guides mounted above said feeding means, each comprising a forward part and a rearward part hingedly connected together, means for supporting the rear ends of said rearward parts, a transverse shaft supporting said forward parts and having oppositely threaded portions threadably receiving said parts, journals for supporting said shaft, supports threadably receiving said journals, said journals being threadable in said supports to bodily move said shaft relative to said feeding means in a transverse direction, and means for rotating said shaft to move said forward parts relative to each other.

15. In a bread slicing machine, the combination with a plurality of regularly spaced cutters and means for conveying sliced bread away from said cutters, of means above said conveying means for properly guiding the sliced loaves of bread on said conveying means comprising a pair of spaced side guides, each including a rearward part adjacent to said cutters and a forward part hinged to said rearward part, a shaft member having oppositely threaded portions thereon, brackets on said forward part having threaded engagement with said portions, a second shaft member having oppositely threaded portions thereon in threaded engagement with said rearward parts, a driving connection between said shafts, and means for rotating one of said shafts whereby said shafts will move said side guides relative to each other.

16. In a bread slicing machine, the combination with a plurality of regularly spaced cutters and means for conveying sliced bread away from said cutters, of means above said conveying means for properly guiding the sliced loaves of bread on said conveying means comprising a pair of spaced side guides, each including a rearward part adjacent to said cutters and a forward part hinged to said rearward part, a shaft member having oppositely threaded portions thereon, brackets on said forward part having threaded engagement with said portions, a second shaft member having oppositely threaded portions thereon in threaded engagement with said rearward parts, a driving connection between said shafts, and means for rotating one of said shafts whereby said shafts will move said side guides relative to each other, said second shaft being moveable transversely of said conveying means whereby said rearward parts may be simultaneously and bodily moved relative to said cutters in a transverse direction.

17. In a bread slicing machine, the combination with a plurality of regularly spaced cutter blades, a feeding means at one side of said blades and a conveying means at the other side of said blades, of a pair of side guides above said feeding means, a pair of side guides above said conveying means, individual means for moving the ends of each pair of side guides adjacent said cutters toward and away from each other, and a common means for actuating said individual means.

18. In a bread slicing machine, the combination with a plurality of regularly spaced cutter blades, a feeding means at one side of said blades and a conveying means at the other side of said blades, of a pair of side guides above said feeding means, a pair of side guides above said conveying means, individual means for bodily moving the ends of each pair of side guides adjacent said cutters as a unit transversely of said cutters, and common means for actuating said individual means.

19. In a bread slicing machine having a plurality of spaced cutters and conveying means for moving loaves of bread relative to said cutters, means for properly guiding the loaves of bread during their movement by said conveying means, comprising a pair of spaced side guides mounted above said conveying means with certain of their ends adjacent said cutters, a common support for said ends, means for supporting said common support and means for bodily moving said common support whereby to move said ends as a unitary structure in a horizontal direction transversely of the path of movement of said loaves.

WILLIAM E. BETTENDORF.